US005583587A

United States Patent [19]
Hasegawa

[11] Patent Number: 5,583,587
[45] Date of Patent: Dec. 10, 1996

[54] GLASSES WITH EASILY ATTACHABLE NOSE PAD DEVICE

[75] Inventor: Keizo Hasegawa, Tokyo, Japan

[73] Assignee: Hasegawa Bicoh Co., Ltd., Tokyo, Japan

[21] Appl. No.: 510,100

[22] Filed: Aug. 1, 1995

[30] Foreign Application Priority Data

Aug. 11, 1994 [JP] Japan .................................. 6-209384

[51] Int. Cl.⁶ ............................... G02C 5/12; G02C 1/00
[52] U.S. Cl. .............................................. 351/138; 351/80
[58] Field of Search .................................... 351/136, 138, 351/78, 80

[56] References Cited

U.S. PATENT DOCUMENTS 2,471,063  5/1949  Devoe ....................... 351/136

Primary Examiner—Huy Mai
Attorney, Agent, or Firm—Kanesaka & Takeuchi

[57] ABSTRACT

A nose pad device for glasses is formed of a nose pad, and a pad box attached to a frame of the glasses. The nose pad includes a main portion for constituting a pad, and a leg attached to the main portion. The leg has a pair of grooves formed in each side wall of the leg. The pad box includes a pair of side portions, a closed end at one side of the side portions, an opening situated between the side portions at a side opposite to the closed end, and a pair of projections situated in the side portions to face with each other. When the leg of the nose pad is inserted into a space between the side portions through the opening, the grooves engage the projections, and the nose pad is firmly held in the pad box. The nose pad can be easily attached to and detached from the pad box.

6 Claims, 3 Drawing Sheets

GLASSES WITH EASILY ATTACHABLE NOSE PAD DEVICE

BACKGROUND OF THE INVENTION AND RELATED ART STATEMENT

The present invention relates to a pair of glasses with an easily attachable nose pad device.

A frame for glasses includes a pair of nose pads for supporting the frame and the glasses on a nose of a wearer. In some glasses, the nose pads are integrally attached to the frame. However, in order to locate the glasses on a proper position on a nose of a wearer, the nose pads are mostly fixed to the frame detachably through pad boxes. If necessary, the nose pads are exchanged by different nose pads for properly fitting the glasses to each wearer.

In a conventional nose pad device, as shown in FIG. 1, a main portion 1 of a nose pad has an oval shape with long and short distance portions. A front surface of the main portion 1 is curved smoothly, and a rear surface thereof is flat, to which a leg 2 in a rectangular shape is fixed. The leg 2 is inserted into a rectangular pad box 3 attached to a frame F. The leg 2 is fixed to the pad box 3 by a nylon thread 4, a screw and so on.

Since the leg 2 and the pad box 3 are small, it is very difficult to fix the leg 2 to the pad box 3 by the nylon thread 4 and so on. Therefore, assembly of the leg 2 to the pad box 3 is a troublesome work in manufacturing a frame for glasses.

In order to easily attach to and detach from the leg 2 to the pad box 3, a nose pad device as shown in FIG. 2 was proposed. In the nose pad device as shown in FIG. 2, a pad box 3' does not have a box shape, and is shaped in an inverse U-shape, wherein lower or end portions of opposing side portions 7, when the glasses are disposed horizontally as a wearing position, are bent inwardly to form bent portions 5. Projections 6 facing with each other are formed at the inner surfaces of the side portions 7. On the other hand, a leg 2' attached to the main portion 1 of the nose pad is provided with grooves 8 extending along the long distance portion of the nose pad. When the nose pad is attached to the pad box 3', the leg 2' is inserted from a front side to a space surrounded by the side portions 7 and the bent portions 5, and the projections 6 are engaged with the grooves 8.

In this structure, when a fitting adjustment is made, since a force is applied to the leg 2' in the same direction as in the removal of the leg 2' from the pad box 3', the leg 2' is easily detached from the pad box 3'. Thus, the attachment of the leg 2' to the pad box 3' must be made strongly. Otherwise, the nose pad device shown in FIG. 2 can not be used practically, and the handing of the nose pad device is not good. Also, when the leg 2' is removed from the pad box 3', a device, such as a screw driver 9, must be inserted into a space between the bent portions 5 to forcibly enlarge the space, by which the pad box 3' may be broken. Thus, the working or handling ability is not good.

The present invention has been made to obviate the problems in the conventional nose pad device.

An object of the invention is to provide a nose pad device, in which a nose pad can be easily attached to a pad box.

Another object of the invention is to provide a nose pad device as stated above, in which the nose pad is not accidentally detached from the pad box in a fitting adjustment.

A further object of the invention is to provide a nose pad device as stated above, in which the device can be easily handled.

Further objects and advantages of the invention are apparent from the following description of the invention.

SUMMARY OF THE INVENTION

In the present invention, a nose pad device is easily attached to a frame of glasses. The nose pad device is formed of a nose pad and a pad box attached to the frame. The nose pad includes a main portion for constituting a pad, and a leg attached to and extending outwardly from the main portion. The leg has a pair of side walls and a pair of grooves, wherein each groove is formed in each side wall.

The pad box attached to the frame includes a pair of side portions, a closed end at one side of the side portions, an opening situated between the side portions at a side opposite to the closed end, and a pair of projections situated in the side portions to face with each other. When the nose pad is assembled with the pad box, the leg of the nose pad is inserted into a space between the side portions through the opening. As a result, the grooves engage the projections, and the nose pad is firmly held in the pad box.

When the glasses are located horizontally as a wearing position, the side portions orient substantially vertically relative to the glasses to locate the opening at a lower portion in the pad box. The leg abuts against the closed end of the pad box to support the frame. Therefore, when the glasses are worn, the nose pad contacts a nose of a wearer and supports the glasses thereat. Since the projections engage the grooves of the leg, the leg does not disengage from the pad box in the lateral direction even if the lateral force is applied thereto.

Preferably, the side portions include projecting edges at portions opposite to the closed end, which face against each other. The projecting edges define the opening therebetween.

When the leg is inserted into the pad box upwardly through the opening, the both sides of the leg are urged by the projecting edges and the leg slides into the space between the side portions while the projections engage the grooves of the leg. The leg can be smoothly inserted into the pad box without using any tool, and can be stably held therein.

When a fitting adjustment is made, a force is applied to the nose pad, but the force is applied generally perpendicularly to the inserting direction of the nose pad. Since the projections in the pad box engage the grooves of the leg, the nose pad is not accidentally disengaged from the pad box.

In the present invention, since the leg is urged or pressed by the side portions, the nose pad does not accidentally disengage from the pad box. Especially, when the projecting edges are located under the leg, the nose pad is surely held in the pad box. In case the nose pad is removed from the pad box, the nose pad may be strongly pulled downwardly without using a tool. Thus, the nose pad can be exchanged easily if required.

DETAILED DESCRIPTION OF PREFERRED EMBODIMENT

Figure 1:
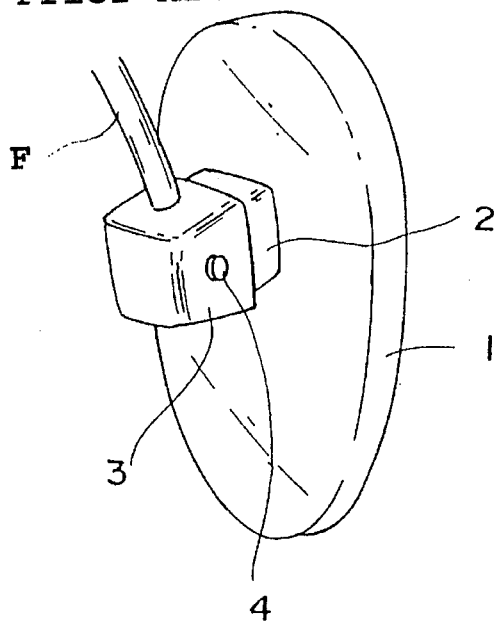
FIG. 1 is a perspective view of one type of the conventional nose pad devices.
Figure 2:
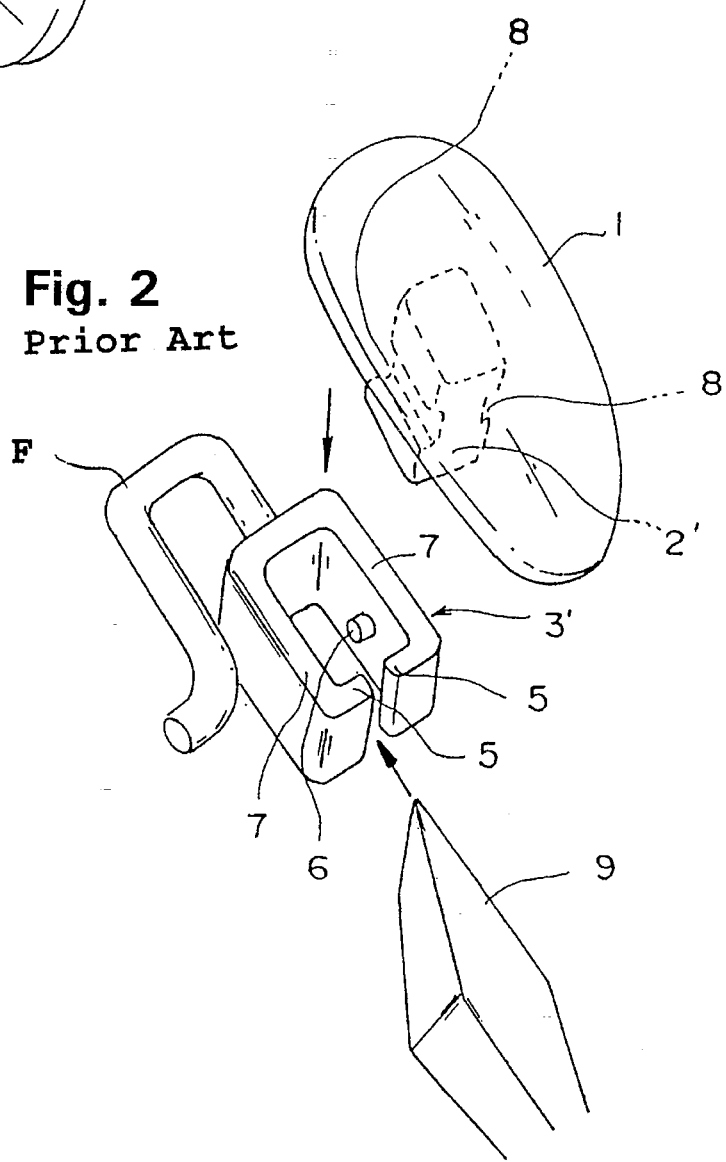
FIG. 2 is a perspective view of a different type of the conventional nose pad devices for showing assembly thereof.
Figure 3:
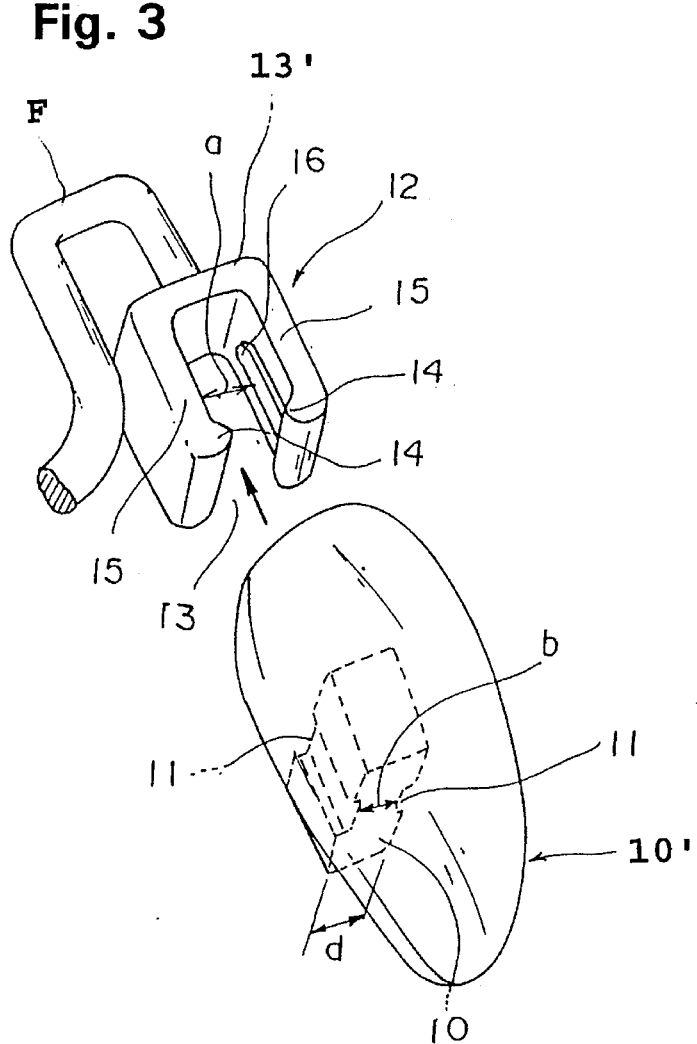
FIG. 3 is a perspective view of a nose pad device of the present invention for showing assembly thereof.
Figure 4:
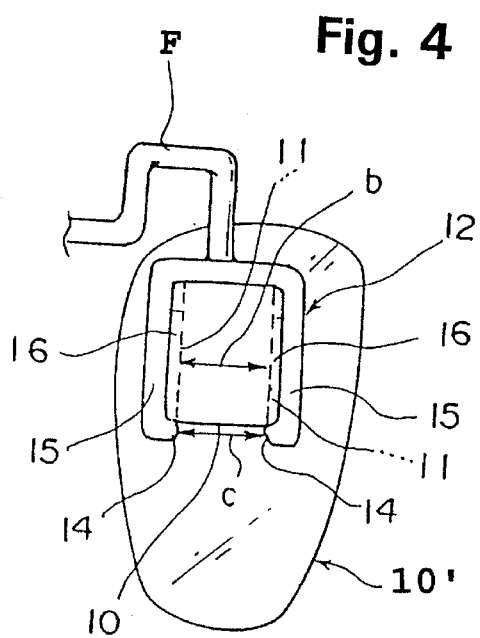
FIG. 4 is a side view of the assembled nose pad device.
Figure 5:
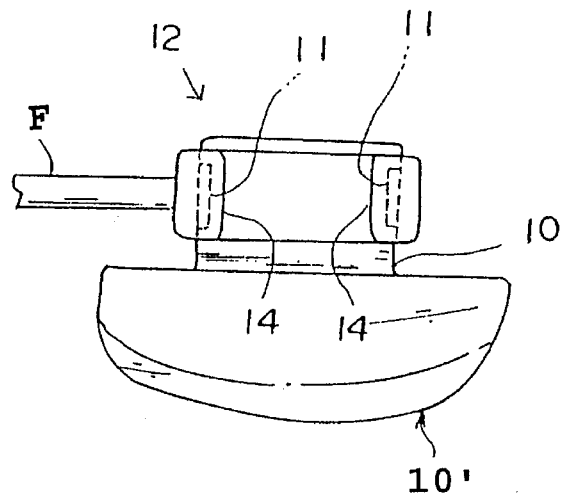
FIG. 5 is a bottom view of the assembled nose pad device.
Figure 6:
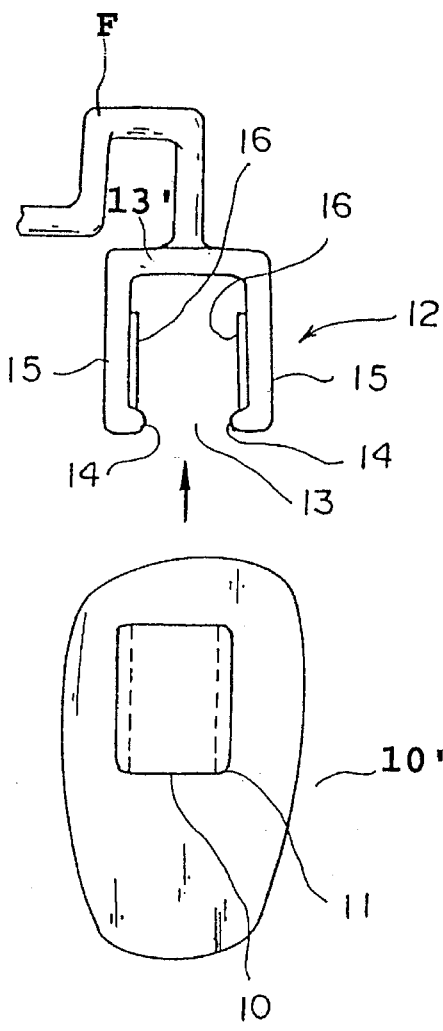
FIG. 6 is a side view of the nose pad device similar to FIG. 3.

Referring to FIGS. 3–6, a nose pad device of the invention is shown. The nose pad device is formed of a nose pad touching a nose of a wearer, and a pad box 12 fixed to a frame F. The nose pad is formed of a main portion 10' made of a plastic, which has an oblong shape in plane with long and short distant portions. The front surface of the main portion 10' is curved smoothly, and the rear surface thereof is flat. A fixing leg 10 is integrally fixed to the rear surface of the main portion 10', and grooves 11 orienting laterally outwardly are formed at the side portions or walls thereof along the long distant portion of the main portion 10'.

The pad box 12 fixed to the frame F is made of metal. The pad box 12 is formed of a pair of side portions 15, and includes a closed end 13' and an opening 13. The side portions 15 include projecting edges 14 facing to each other to define the opening 13 therebetween. When the glasses are positioned horizontally in a wearing position, the opening 13 orients downwardly.

At the inner surfaces of the side portions 15, projections 16 are arranged to face to each other along the longitudinal direction thereof. The projection 16 extends substantially in the side portion 15, but the projection 16 may extend partly in the side portion 15. The distance a between the projections 16 is substantially the same as the distance b between the grooves 11. Also, the distance c between the projecting edges 14 is slightly smaller than the width d of the leg 10.

When the nose pad is assembled with the pad box 12, the leg 10 is inserted into a space between the side portions 15 through the opening 13 so that the projections 16 engage the grooves 11. When the leg 10 is inserted into the pad box 12, the projecting edges 14 are slightly pushed outwardly, and the leg 10 can smoothly slide between the projecting edges 14. When the leg 10 is completely entered into the pad box 12, the projecting edges 14 is located under or outside the leg 10. Thus, the leg 10 is surely supported by the projecting edges 14, so that the leg 10 does not accidentally disengage from the pad box 12. Since the projections 16 engage the grooves 11 of the leg 10, the nose pad does not disengage from the pad box 12 in the direction perpendicular to the insertion direction of the leg 10, i.e. downwardly in FIG. 5.

When the thus assembled nose pad is removed from the pad box 12, the main portion 10' with the leg 10 is strongly pulled in the direction opposite to the insertion direction. Since the corners of the projecting edges 14 are rounded or curved, the leg 10 can be removed from the pad box 12. In the invention, no tool is required for assembly and disassembly of the nose pad to the pad box.

Also, when the fitting adjustment for the glasses is made, a force for the fitting adjustment is generally different from the insertion direction of the nose pad, i.e. perpendicular to the insertion direction. Therefore, the nose pad does not accidentally disengage from the pad box when the fitting adjustment is made.

As explained above, the nose pad can be easily attached to and detached from the pad box without using a tool. Also, the nose pad does not accidentally disengage from the pad box in the fitting adjustment. The frame for the glass can be easily manufactured.

While the invention has been explained with reference to the specific embodiment of the invention, the explanation is illustrative and the invention is limited only by the appended claims.

What is claimed is:

1. A nose pad device for glasses with a frame, comprising:

a nose pad including a main portion for constituting a pad, and a leg attached to the main portion to project outwardly therefrom, said leg having a pair of parallel side walls, top and bottom walls extending between the parallel side walls, and a pair of grooves, each groove being formed in each side wall throughout an entire length of the side wall, a pad box attached to the frame and including a pair of side portions, a closed end situated between the side portions, and projecting edges fixed to the respective side portions at a side opposite to the closed end to form an opening therebetween, said projecting edges facing to each other and having rounded corners arranged parallel to each other, said opening having a size slightly smaller than a length between the side walls of the leg so that when the leg is inserted into the pad box through the opening, the projecting edges are urged outwardly to allow the leg to pass therebetween; when the top wall of the leg abuts against the closed end to entirely locate the leg in the pad box, the projecting edges hold the bottom wall of the leg; and when the leg in the pad box is pulled toward the opening, the projecting edges are urged outwardly to allow the leg to pass therebetween, and a pair of elongated projections attached to the side portions of the pad box to face to each other, each elongated projection extending from the projecting edge toward the closed end and having the height substantially the same as the height of the groove so that when the leg is inserted into the pad box through the opening, the projections engage the grooves to firmly hold the nose pad in the pad box.

2. A nose pad device according to claim 1, wherein said side portions orient substantially vertically relative to the glasses to locate the opening at a lower portion in the pad box when the glasses are disposed horizontally in a wearing position so that when the glasses are worn, the nose pad contacts a nose of a wearer and holds the glasses thereat.

3. A nose pad device according to claim 1, wherein the distance between the elongated projections in the pad box is substantially same as the distance between the grooves.

4. A nose pad device according to claim 3, wherein said leg has an elongated rectangular shape, said grooves being formed along a longitudinal direction of the leg to securely retain the nose pad in the pad box.

5. A nose pad device according to claim 3, wherein the height of the projecting edge is greater than that of the projection.

6. A nose pad device according to claim 5, wherein said projections substantially completely extend inside the pad box.

* * * * *